(12) United States Patent
Rand

(10) Patent No.: US 10,455,339 B2
(45) Date of Patent: Oct. 22, 2019

(54) ALWAYS-ON DETECTION SYSTEMS

(71) Applicant: Cirrus Logic International Semiconductor Ltd., Edinburgh (GB)

(72) Inventor: Robert David Rand, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/875,175

(22) Filed: Jan. 19, 2018

(65) Prior Publication Data

US 2019/0230458 A1    Jul. 25, 2019

(51) Int. Cl.

| | |
|---|---|
| H04R 29/00 | (2006.01) |
| G10L 15/22 | (2006.01) |
| G10L 15/08 | (2006.01) |
| G11B 20/10 | (2006.01) |
| H04R 3/00 | (2006.01) |
| G08B 6/00 | (2006.01) |
| G10L 25/48 | (2013.01) |
| G10L 25/78 | (2013.01) |

(52) U.S. Cl.
CPC ............ *H04R 29/001* (2013.01); *G10L 15/08* (2013.01); *G10L 15/22* (2013.01); *G11B 20/10527* (2013.01); *H04R 3/00* (2013.01); *G08B 6/00* (2013.01); *G10L 25/48* (2013.01); *G10L 25/78* (2013.01); *G10L 2015/088* (2013.01); *G10L 2015/223* (2013.01); *G11B 2020/10546* (2013.01); *H04R 29/00* (2013.01); *H04R 2203/00* (2013.01); *H04R 2400/03* (2013.01)

(58) Field of Classification Search
CPC .... H04R 29/001; H04R 3/00; H04R 2400/03; H04R 29/00; H04R 2203/00; G10L 15/08; G10L 15/22; G10L 2015/088; G10L 2015/223; G10L 25/48; G10L 25/78; G11B 20/10527; G11B 2020/10546; G08B 6/00
See application file for complete search history.

(56) References Cited

U.S. PATENT DOCUMENTS

| | | | | |
|---|---|---|---|---|
| 9,520,036 | B1* | 12/2016 | Buuck | G08B 6/00 |
| 2013/0127755 | A1* | 5/2013 | Lynn | G08B 6/00 |
| | | | | 345/173 |
| 2013/0289994 | A1* | 10/2013 | Newman | G10L 15/22 |
| | | | | 704/254 |
| 2016/0132118 | A1* | 5/2016 | Park | G06F 3/016 |
| | | | | 345/173 |
| 2016/0358605 | A1* | 12/2016 | Ganong, III | H04W 52/0251 |
| 2018/0253123 | A1* | 9/2018 | Levesque | G06F 1/1652 |

* cited by examiner

*Primary Examiner* — Andrew L Sniezek
(74) *Attorney, Agent, or Firm* — Jackson Walker, L.L.P.

(57) ABSTRACT

The present disclosure relates to a system for providing an acknowledgement output at an output transducer of a device in response to detection of a trigger signal. The system includes an input transducer, a signal processor, a main processor separate from the signal processor and an output driver. The signal processor monitors an input signal received at the signal processor from the input transducer and outputs an acknowledgement signal to the output driver if the received input signal corresponds to the trigger signal. The signal processor also outputs an interrupt signal to the main processor to cause the main processor to enter an active state. In this way an acknowledge output can rapidly be provided to a user of the system, as there is no need to wait until the main processor has entered its active state and processed the trigger signal.

12 Claims, 3 Drawing Sheets

ALWAYS-ON DETECTION SYSTEMS

FIELD OF THE INVENTION

The present disclosure relates to the field of always-on detection systems. In particular, the present disclosure relates to a system and method for providing an acknowledgement output in response to detection of a trigger signal in an always-on detection system.

BACKGROUND

Modern devices such as smartphones, tablet computers, smart watches, smart speakers, smart televisions and the like are increasingly being provided with voice recognition capabilities, permitting a user to issue spoken commands to the device to command it to perform particular actions. For example, a user may issue a spoken command to cause the device to commence playback of a chosen audio track, to activate, deactivate or adjust the operation of an appliance such as a lamp or television that is connected to the device, or may issue a spoken command to cause the device to retrieve information such as news, traffic or weather information from the Internet and provide a spoken summary of such information.

Typically such devices are provided with an always-on audio detection system, which is operative continually to monitor an audio input received at an audio input transducer such as a microphone of the device. The always-on audio detection system is configured to distinguish between normal conversation that is not directed at the device and spoken commands that are directed at the device. Audio input recognized as normal conversation is ignored by the device, whereas audio input that is recognized as a spoken command that is directed at the device causes the device to perform an appropriate action in response to the command.

In order to facilitate the distinction between normal conversation and spoken commands that are directed at the device, such devices typically require an audio trigger, such as a specific spoken word or phrase uttered by the user or a sound such as a handclap or whistle, to be provided by the user prior to the user issuing a spoken command. For example, if the user were simply to ask the question "What's the weather forecast for tomorrow?", the device would interpret this as normal conversation rather than a command directed at the device. However, if the user were to speak a trigger word before asking the question, e.g. uttering the phrase "Device! What's the weather forecast for tomorrow?", the device would recognize the audio trigger "Device!" and would then respond to the question "What's the weather forecast for tomorrow?" by retrieving relevant weather information from the Internet and providing a spoken summary of that information.

The always-on audio detection system is typically provided as a part of a signal processor that is separate from a main processor or application processor of the device. This arrangement enables the power consumption of the device to be reduced when not in active use, as the main or application processor can be placed in an inactive or sleep state when the device is not in active use, whilst the signal processor incorporating the always-on audio detection system, which has a lower power consumption than the main or application processor, remains on, actively monitoring the input audio signal. When the always-on audio detection system detects the audio trigger it can send an interrupt to the main or application processor to switch the main or application processor into its active or awake state in order to process the trigger signal and respond to a subsequently detected user command.

One problem that can arise in such arrangements is that once the always-on audio detection system has detected the audio trigger, it must send the audio trigger and any subsequent command to the main or application processor, which transmits the audio trigger and command to a remote server via the Internet for verification of the audio trigger, i.e. confirmation that the audio trigger is a valid audio trigger. Only after this confirmation has been received by the device does the device acknowledge to the user that the command has been accepted, typically by outputting a specific audio tone. This causes a delay between the user issuing a command and receiving confirmation that the command has been accepted. The delay is variable but can be as much as 2-6 seconds. As will be appreciated, in the absence of a rapid confirmation that a command has been accepted, a user may re-issue the command, perhaps multiple times, until confirmation is provided that the command has been accepted. This can lead to multiple instances of the command being accepted and responded to, which may cause confusion and frustration to the user.

SUMMARY

According to a first aspect, the invention provides a system for providing an acknowledgement output at an output transducer of a device in response to detection of a trigger signal, the system comprising: an input transducer; a signal processor coupled to the input transducer; a main processor separate from the signal processor; and an output driver, wherein the signal processor is configured to: monitor an input signal received at the signal processor from the input transducer; and if the received input signal corresponds to the trigger signal: output an acknowledgement signal to the output driver to cause the output driver to drive the output transducer to output the acknowledgement output; and output an interrupt signal to the main processor to cause the main processor to enter an active state.

In the system of the first aspect an acknowledgement that a trigger signal issued by the user has been received is output by the system without any need to wait for the main processor to enter its active state to process the trigger signal, thereby rapidly informing the user that the trigger input has been received.

The input transducer may be an audio input transducer, and the signal processor may be configured to monitor an audio input signal received at the signal processor from the audio input transducer.

The signal processor may comprise an always-on audio detection system configured to monitor the audio input signal received at the signal processor from the audio input device.

The system may further comprise a memory, and the memory may be configured to store one or more acknowledgement signals corresponding to the acknowledgement output.

The one or more acknowledgement signals corresponding to the acknowledgement output may comprise one or more of: an audio acknowledgement signal or waveform; a haptic acknowledgement signal or waveform; and a visual acknowledgement signal.

The output driver may comprise a haptic output driver and the acknowledgement output may comprise a haptic output, and the signal processor may be configured to output a haptic acknowledgement signal to the haptic output driver.

The output driver may comprise an audio output driver and the acknowledgement output may comprise an audio output, and the signal processor may be configured to output an audio acknowledgement signal to the audio output driver.

The output driver may comprise a visual output driver and the acknowledgement output may comprise a visual output, and the signal processor may be configured to output a visual acknowledgement signal to the visual output driver.

The memory may be on-board memory of the signal processor.

The main processor may be configured to enter an inactive state when not in use.

The trigger signal may be a voice command.

The system according may further comprise a buffer, and the buffer may be configured to store audio input received by the audio input transducer after the trigger signal has been received, and the system may be configured to transmit the contents of the buffer to the main processor after the main processor has entered its active state.

A further aspect of the invention provides a method for providing an acknowledgement output at an output transducer of a device in response to detection of a trigger signal, the method comprising: monitoring, at a signal processor, an input signal received at the signal processor from an input transducer; and if the received input signal corresponds to the trigger signal: outputting, from the signal processor, an acknowledgement signal to an output driver of the device to cause the output driver to drive the output transducer to output the acknowledgement output; and outputting, from the signal processor, an interrupt signal, to cause a main processor of the device to enter an active state.

The input transducer may be an audio input transducer and the method may further comprise monitoring, at the signal processor, an audio input signal received at the signal processor from the audio input transducer.

The signal processor may comprises an always-on audio detection system configured to monitor the audio input signal received at the signal processor from the audio input device.

The method may further comprise storing, in a memory, one or more acknowledgement signals corresponding to the acknowledgement output.

The one or more acknowledgement signals corresponding to the acknowledgement output may comprise one or more of: an audio acknowledgement signal or waveform; a haptic acknowledgement signal or waveform; and a visual acknowledgement signal.

The output driver may comprise a haptic output driver and the acknowledgement output may comprise a haptic output, and the method may comprise outputting, by the signal processor, a haptic acknowledgement signal to the haptic output driver.

The output driver may comprise an audio output driver and the acknowledgement output may comprise an audio output, and the method may comprise outputting, by the signal processor, an audio acknowledgement signal to the audio output driver.

The output driver may comprise a visual output driver and the acknowledgement output may comprise a visual output, the method comprise outputting, by the signal processor, a visual acknowledgement signal to the visual output driver.

The memory may be on-board memory of the signal processor.

The method may comprise causing the main processor to enter an inactive state when not in use.

The trigger signal may be a voice command.

The method may further comprise storing, in a buffer, audio input received by the audio input transducer after the trigger signal has been received, and transmitting the contents of the buffer to the main processor after the main processor has entered its active state.

A further aspect of the invention provides a signal processor for providing an acknowledgement output at an output transducer of a device in response to detection of a trigger signal, wherein the signal processor is configured to: monitor an input signal received at the signal processor from an input transducer; and if the received input signal corresponds to the trigger signal: output an acknowledgement signal to an output driver of the device to cause the output driver to drive the output transducer to output the acknowledgement output; and output an interrupt signal to cause a main processor of the device to enter an active state.

The input transducer may be an audio input transducer and the signal processor may be configured to monitor an audio input signal received at the signal processor from the audio input transducer.

The signal processor may comprise an always-on audio detection system configured to monitor the audio input signal received at the signal processor from the audio input device.

The output driver may comprise a haptic output driver and the acknowledgement output may comprise a haptic output, and the signal processor may be configured to output a haptic acknowledgement signal to the haptic output driver.

The output driver may comprise an audio output driver and the acknowledgement output may comprise an audio output, and the signal processor may be configured to output an audio acknowledgement signal to the audio output driver.

The output driver may comprise a visual output driver and the acknowledgement output may comprises a visual output, and the signal processor may be configured to output a visual acknowledgement signal to the visual output driver.

The signal processor may comprise memory.

The memory may be configured to store one or more acknowledgement signals corresponding to the acknowledgement output.

The one or more acknowledgement signals corresponding to the acknowledgement output may comprise one or more of: an audio acknowledgement signal or waveform; a haptic acknowledgement signal or waveform; and a visual acknowledgement signal.

The main processor of the device may be configured to enter an inactive state when not in use.

The trigger signal may be a voice command.

The signal processor may be configured to receive the contents of a buffer after the main processor has entered its active state, the buffer being configured to store audio input received by the audio input transducer after the trigger signal has been received.

BRIEF DESCRIPTION OF THE DRAWINGS

Embodiments of the invention will now be described, strictly by way of example only, with reference to the accompanying drawings, of which.

DETAILED DESCRIPTION

Figure 1:
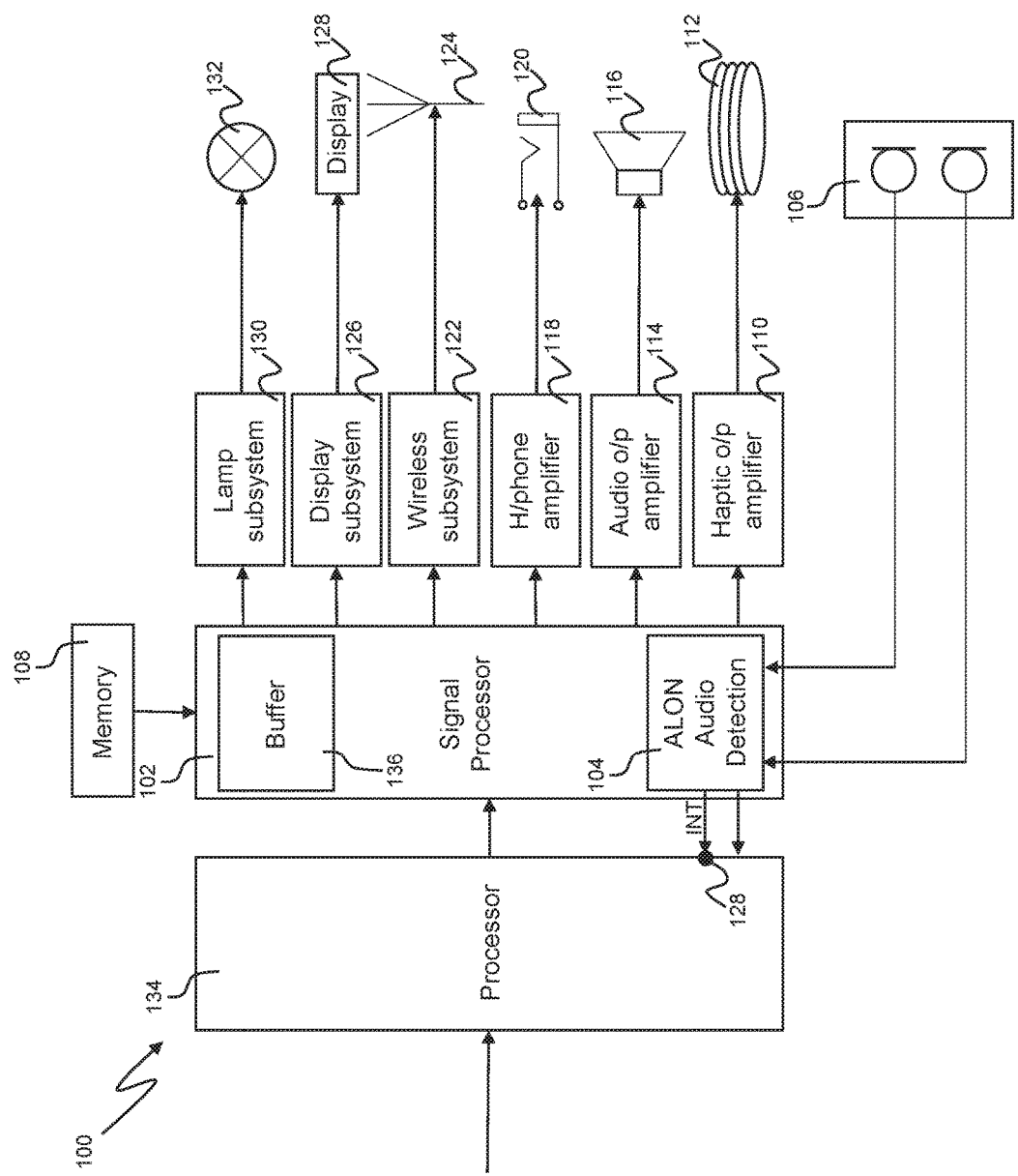
FIG. 1 is a schematic diagram showing part of a device having an always-on audio detection system.

FIG. 1 is a schematic diagram showing part of a device 100 having a signal processor 102 including an always-on audio detection system 104. The device 100 may be, for example, a mobile telephone, tablet or laptop computer, smart watch, virtual reality (VR) or augmented reality (AR) device, smart speaker or smart television. For the sake of clarity elements of the device 100 which are not relevant to the present disclosure are not shown in FIG. 1, but those skilled in the art will appreciate that the device 100 may include further elements and components in addition to those shown in FIG. 1.

The always-on audio detection system 104 is coupled to an audio input transducer arrangement 106, which in the example shown in FIG. 1 comprises a pair of microphones, such that audio from the environment surrounding the device 100 can be detected in a continuous manner.

The signal processor 102 also interfaces with a memory 108, which in the example shown in FIG. 1 is separate from the signal processor 102, but which may also form part of the signal processor 102. For example, the memory 108 may be on-board memory of the signal processor 102. The memory 108 stores haptic, audio and visual output signals that are output by the signal processor 102 to output drivers of the device, which in turn drive haptic, audio and visual output transducers of the device 100 and external accessory devices, as will be explained in further detail below.

The signal processor 102 has a first output which interfaces with a haptic output amplifier 110. The haptic output amplifier 110 is configured to drive a haptic output transducer 112, which may be, for example, a linear resonant actuator or the like.

The signal processor 102 has a second output which interfaces with an audio output amplifier 114. The audio output amplifier 114 is configured to drive an audio output transducer 116, which may be, for example, one or more loudspeakers.

The signal processor 102 may have a third output which interfaces with a headphone amplifier 118. The headphone amplifier 118 is configured to drive one or more external wired accessory devices such as headphones, earphones, earbuds or the like, which may be connected to the headphone amplifier 118 by means of a jack socket 120 which is configured to receive a corresponding plug of the external wired accessory device.

The signal processor 102 may have a fourth output which interfaces with a wireless communications subsystem 122, which is configured to generate wireless signals complying with one or more wireless communications protocols such as Bluetooth®, WiFi° or the like, for transmission to an external wireless accessory device such as, for example, a wireless headset, via an antenna 124.

The signal processor 102 may have a fifth output which interfaces with a display subsystem 126, which is configured to drive a display 128 of the device 100, which may be, for example, a touch screen display.

The signal processor 102 may have a sixth output which interfaces with a lamp subsystem 130, which is configured to drive a lamp 132 of the device 100.

The device 100 also includes a main processor 134, which may be, for example, an application processor. The main processor 134 is separate from the signal processor 102 and interfaces with the signal processor 102, to provide signals to be processed by the signal processor 102 for subsequent output by one or more of the output drivers (haptic output amplifier 110, audio output amplifier 114, headphone amplifier 118, wireless subsystem 122, display subsystem 126, or lamp subsystem 130).

To increase the power efficiency of the device 100, the main processor 134 is configured to enter an inactive or sleep state when it is not required. The signal processor 102 and the always-on audio detection system 104 remain active at all times, in order to detect audio triggers indicating that the user requires the device 100 to perform an action in response to a user command.

The processor 100 is provided with an interrupt line 128, which is coupled to an output of the always-on audio detection system 104, so that when the always-on audio detection system 104 detects an audio trigger, an interrupt signal can be input to the interrupt line 128 to cause the processor 134 to return to its active or awake state so as to process the received command, allowing the device 100 to respond appropriately.

As discussed above, known devices that respond to audio commands can suffer from a delay between a user issuing a command and the device 100 outputting an acknowledgement signal. The system 100 is configured to minimize or at least reduce this delay, as will now be explained with reference to FIG. 2.

Figure 2:
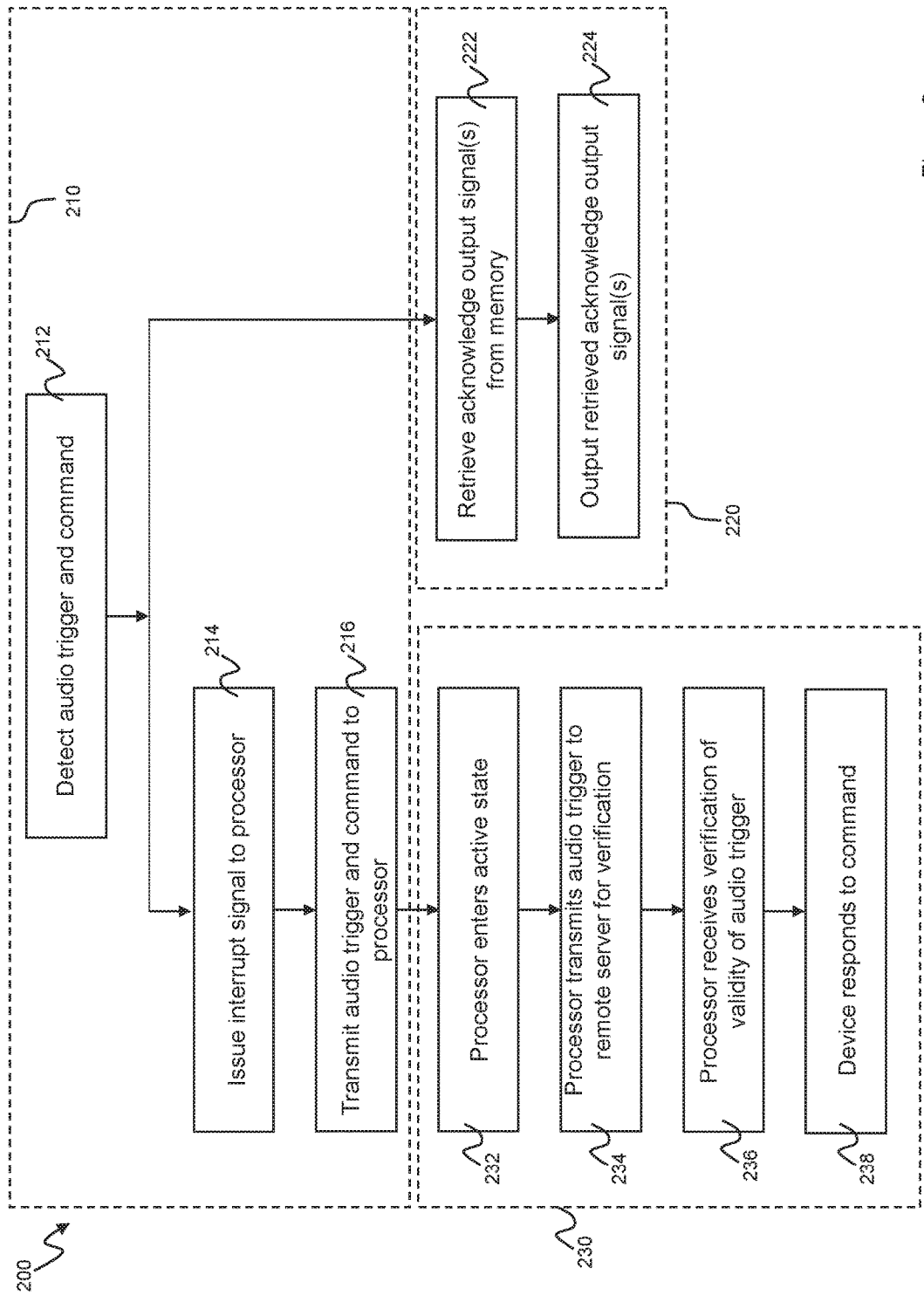
FIG. 2 is a flow chart illustrating steps performed by a signal processor to provide an acknowledgement output on detection of an audio trigger signal.

In the flow chart 200 of FIG. 2, actions performed by the always-on audio detection system 104 are shown in the box labelled 210, whilst actions performed by the signal processor 102 are shown in the box labelled 220 and actions performed by the main processor 134 are shown in the box labelled 230.

At step 212, the always-on audio detection system 104 detects an audio trigger and command. As discussed above, the audio trigger may be, for example, a specific spoken word such as "Device" or a sound such as a handclap or whistle, whilst the command may be a spoken instruction such as "Dim the living room lights" or a question, such as "What is the weather forecast for tomorrow?". In response to the detection of the audio trigger and command, the always-on audio detection system 104 issues an interrupt signal to the main processor 134 (step 214) and transmits the detected audio trigger and command to the main processor 134 (step 216).

In response to detection of the audio trigger and command by the always-on audio detection system 104, the signal processor 102 retrieves (at step 222) one or more acknowledgement output signals from the memory 108. Alternatively, the one or more acknowledgement output signals may be generated in real-time by the signal processor 102. The acknowledgement output signal(s) retrieved or generated may be dependent upon predefined settings such as user preferences, or upon output devices that are available or connected to the device 100.

For example, if the device 100 includes audio output transducer 116 and haptic output transducer 112, then the signal processor 102 may generate or retrieve from the memory 108 an audio output signal or waveform corresponding to an acknowledge audio tone to be output by the audio output transducer 116 and a haptic output signal or waveform corresponding to an acknowledge vibration effect to be output by the haptic output transducer.

Alternatively, if a wireless accessory device is connected to the device 100, the signal processor 102 may generate or retrieve from the memory 108 an audio output signal or waveform corresponding to an acknowledge audio tone to be output by an audio transducer of the wireless accessory device.

Similarly, if an external wired accessory device such as headphones, earphones or earbuds is connected to the device 100 by means of the jack socket 120, the signal processor 102 may retrieve from the memory 108 an audio output signal or waveform corresponding to an acknowledge audio tone to be output by the external wired accessory device.

If the device 100 includes display 128, then the signal processor 102 may generate or retrieve from memory 108 a video output signal corresponding to an acknowledge video signal to be output by the display 128. The acknowledge video signal may cause the display 128 to display an acknowledge image or message, or may cause a backlight of the display 128 to switch on to illuminate the display, for example. Similarly, if the device 100 includes lamp 132, then the signal processor 102 may generate or retrieve from memory 108 a signal corresponding to an acknowledge lamp signal to be output by the lamp 132. The acknowledge lamp signal may cause the lamp 132 to switch on for a predetermined period of time, or may cause the lamp to switch on and off in a predetermined sequence, for example.

At step 224 the signal processor 102 outputs the acknowledge output signals to the appropriate output driver(s) 110, 114, 118, 122, 126, 130, which in turn cause the appropriate acknowledge audio and/or haptic signal to be output by the audio output transducer 116 or haptic output transducer 112, or by a wired or wireless external accessory connected to the device 100 by means of the jack socket 120 or wireless subsystem 122 and antenna 124 respectively, and cause the appropriate acknowledge video or lamp signals to be output by the display 128 or lamp 132 if required.

It will be appreciated that the appropriate acknowledge output signals may be output by the signal processor 102 to any of, or any combination of, the output drivers 110, 114, 118, 122, 126, 130.

Thus, in the event that a user has configured the device 100 to provide only haptic acknowledgement signals, the signal processor 102 may output only the haptic acknowledge output signal, thereby causing only the haptic output transducer 112 to output an acknowledge signal.

Similarly, if the user has configured the device to output both audio and haptic acknowledgement signals, the signal processor 102 may output the haptic acknowledge signal to the haptic output amplifier 110 and may output the audio acknowledge signal to the audio output amplifier 114, such that both audio and haptic acknowledgement signals are provided to the user on detection by the always on audio detection system 104 of an audio trigger signal.

If the user has configured the device to output a video or lamp acknowledgement signal (in addition to or instead of other types of acknowledgement output signals), the signal processor 102 may output the video acknowledge signal to the display subsystem 126 and may output the lamp acknowledge signal to the lamp subsystem 130, to cause an appropriate acknowledgement output to be output by the display 128 or the lamp 132.

As a further example, if a wired accessory device is connected to the device 100 by means of the jack socket 120 or a wireless accessory device is connected to the device 100 by means of the wireless sub-system 122 and antenna 124, the signal processor 102 may output the haptic acknowledge signal to the haptic output amplifier 110 and may also output the audio acknowledge signal to the headphone amplifier 118 or wireless sub-system 122 as appropriate, so that a haptic acknowledgement signal is provided at the device 100 (via haptic output transducer 112) and an audio acknowledgement signal is provided at the connected accessory device.

While the signal processor 102 is performing steps 222 and 224 to provide a rapid acknowledgement to the user that the audio trigger and command have been received, the main processor 134, having received the audio trigger and command from the always-on audio detection system 104, enters its active or awake state (at step 232), and, at step 234, transmits the audio trigger via the Internet to a remote server for verification of the audio trigger. If the remote server verifies that the audio trigger is a valid audio trigger, it sends a verification message to the main processor 134, which is received at step 236. On receipt of this verification message, the main processor 134 causes the device 100 to respond to the command in an appropriate manner, at step 238, for example by performing an action or providing a spoken summary of information retrieved by the main processor 134 from the Internet in response to the command.

In the example described above, the received audio trigger and command are transmitted to the main processor 134 together after both the audio trigger and command have been detected. In an alternative approach, the always-on audio detection system 104 may be configured to transmit an interrupt signal to the main processor 134 to cause the main processor 134 to enter its active or awake state as soon as the audio trigger has been detected. In this case the signal processor 102 also outputs appropriate acknowledge output signals in response to detection of the audio trigger.

In this approach, a buffer 136 (which may be provided as part of the signal processor 102, as shown in FIG. 1, or may be provided elsewhere in the device 100) is used to store audio input received by the audio input transducer arrangement 106 after the audio trigger has been received. Such subsequent audio input may correspond to a voice command issued by the user. The contents of the buffer 136 are then transmitted to the main processor 134 when the main processor 134 has entered its active or awake state in response to receiving the interrupt signal from the always-on audio detection system 104. For example, when the main processor 134 has entered its active or awake state, it may transmit a signal to the signal processor 102 indicating that it has entered its active or awake state, and in response to receiving this signal the signal processor 102 may transmit the contents of the buffer 136 to the main processor 134 for processing to execute the user's command.

It will be appreciated that the principles described above are applicable in devices in which an input transducer other than an audio input transducer is provided to detect a trigger signal that is used to indicate that the user wishes to issue a voice command to a device.

Figure 3:
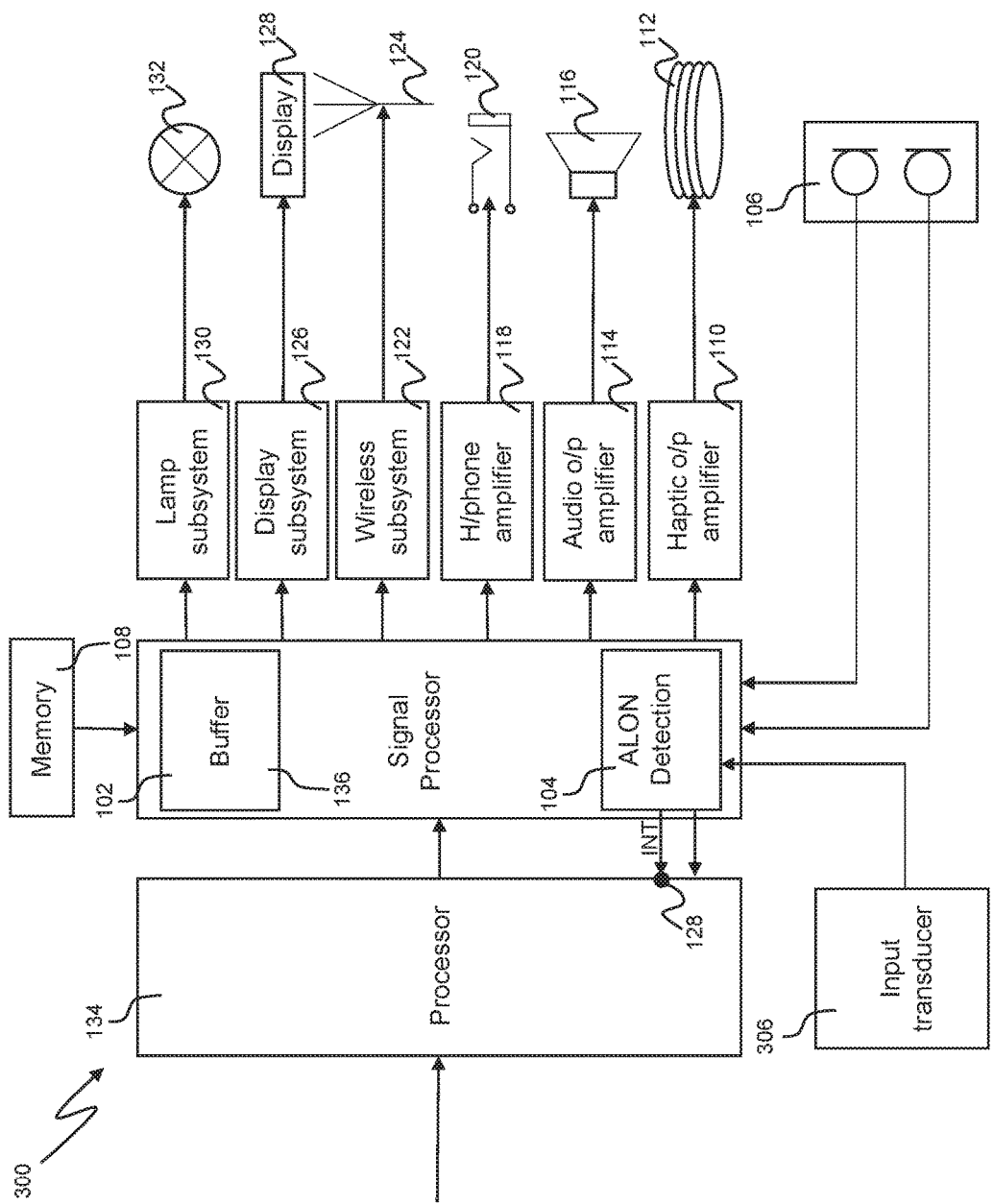
FIG. 3 is a schematic diagram showing part of a device having an always-on detection system for detecting a trigger signal.

FIG. 3 is a schematic diagram showing part of a device 300 having an always-on detection system for detecting a trigger signal indicating that a user of the device wishes to issue a voice command to the device. The device 300 of FIG. 3 is similar to the device 100 of FIG. 1, so like reference signs have been used to represent like elements, and only those elements of the device 300 of FIG. 3 that differ from the device 100 of FIG. 1 will be described here.

The device 300 of FIG. 3 differs from the device 100 of FIG. 1 in that the always-on audio detection system 104 is replaced by an always-on detection system 304 which is configured to detect a trigger signal generated by an input transducer 306 in response to a user input indicative that the user of the device 300 wishes to issue a voice command to the device. The input transducer 306 need not be an audio input transducer, but instead may be any transducer that is able to generate a trigger signal in response to a user input. The input transducer 306 may be, for example, a push switch or button, a touch sensitive surface such as a touch-screen or touch pad, a movement sensor such an accelerometer or gyroscope, or a force-sensing transducer.

The always-on detection system 304 operates in substantially the same manner as the always-on audio detection system 104 of the device 100 of FIG. 1, as described above with reference to FIG. 2. However, instead of detecting an audio trigger, the always-on detection system is configured to detect a trigger signal of a kind that is appropriate to the type of input transducer 306 that is provided.

For example, where the input transducer 306 is a button or push switch, a trigger signal may be generated by a user depressing the button or push switch. A signal output by the button or push switch may be identified by the always-on detection system 304 as a trigger signal if the duration of the signal (corresponding to the length of time for which the button or switch is depressed by the user) exceeds a predefined threshold, for example.

Where the input transducer 306 is a touch sensitive surface, a signal output by the input transducer 306 corresponding to a predefined touch or gesture on the touch sensitive surface may be identified by the always-on detection system 304 as a trigger signal.

Where the input transducer 306 is a movement sensor such an accelerometer or gyroscope, a signal output by the input transducer 306 corresponding to a predefined action such as shaking or tapping the device 300 may be identified by the always-on detection system 304 as a trigger signal.

Where the input transducer 306 is a force-sensing transducer, a signal output by the input transducer 306 corresponding to a predetermined action such as squeezing or pressing part of the device 300 may be identified by the always-on detection system 304 as a trigger signal.

The always-on detection system 304 responds to detection of an identified trigger signal by issuing an interrupt signal to the main processor 134 to cause the main processor 134 to enter its active state, and transmitting a voice command subsequently received from the user by the audio input transducer arrangement 106 to the main processor 134.

Simultaneously or subsequently, the signal processor 102 retrieves one or more acknowledgement output signals (e.g. an audio acknowledgement signal or a haptic acknowledgement signal) from the memory 108 and outputs the acknowledgement output signal(s) to one or more of the output drivers (haptic output amplifier 110, audio output amplifier 114, headphone amplifier 118 or wireless subsystem 122), thereby providing a rapid acknowledgement to the user that the trigger signal has been received by the device 300.

In response to the interrupt signal the main processor 134 enters its active or awake state and responds to the voice command in an appropriate manner, by performing an action or transmitting the providing a spoken summary of information retrieved by the main processor 134 from the Internet in response to the command.

It will be appreciated that the system described herein provides a rapid acknowledgement that a user's trigger signal and command have been received by the device 100. This rapid acknowledgement ensures that the user is aware that the device has received the trigger signal and command, thereby reducing the likelihood that the user will repeatedly issue the command, thus improving the ease of use of the device 100 and the user's experience of using the device 100.

The invention claimed is:

1. A system for providing an acknowledgement output at a haptic output transducer of a device in response to detection of a trigger signal, the system comprising:
an input transducer;
a signal processor coupled to the input transducer;
a main processor separate from the signal processor;
an output driver; and
a memory, wherein the memory is configured to store one or more acknowledgement signals corresponding to the acknowledgement output, wherein the signal processor is configured to:
monitor an input signal received at the signal processor from the input transducer; and
if the received input signal corresponds to the trigger signal:
retrieve, from the memory, an acknowledgement signal comprising a haptic waveform corresponding to an acknowledge effect to be output by the haptic output transducer;
output the acknowledgement signal to the output driver to cause the output driver to drive the haptic output transducer to output the acknowledgement output; and
output an interrupt signal to the main processor to cause the main processor to enter an active state, wherein the main processor is configured to transmit the received input signal to a server for verification that the received input signal is a valid audio trigger.

2. A system according to claim 1 wherein the input transducer is an audio input transducer and wherein the signal processor is configured to monitor an audio input signal received at the signal processor from the audio input transducer.

3. A system according to claim 2 wherein the signal processor comprises an always-on audio detection system configured to monitor the audio input signal received at the signal processor from the audio input device.

4. A system according to claim 2 wherein the trigger signal is a voice command.

5. A system according to claim 2 further comprising a buffer, wherein the buffer is configured to store audio input received by the audio input transducer after the trigger signal has been received, and wherein the system is configured to transmit the contents of the buffer to the main processor after the main processor has entered its active state.

6. A system according to claim 1 wherein the one or more acknowledgement signals corresponding to the acknowledgement output further comprise one or more of:
an audio acknowledgement signal or waveform; and
a visual acknowledgement signal.

7. A system according to claim 1 wherein the memory is on-board memory of the signal processor.

8. A system according to claim 1 wherein the main processor is configured to enter an inactive state when not in use.

9. A method for providing an acknowledgement output at a haptic output transducer of a device in response to detection of a trigger signal, the method comprising:
monitoring, at a signal processor, an input signal received at the signal processor from an input transducer; and
if the received input signal corresponds to the trigger signal:
retrieving, from a memory of the device, an acknowledgement signal comprising a haptic waveform corresponding to an acknowledge effect to be output by the haptic output transducer;

outputting, from the signal processor, the acknowledgement signal to an output driver of the device to cause the output driver to drive the haptic output transducer to output the acknowledgement output;

outputting, from the signal processor, an interrupt signal, to cause a main processor of the device to enter an active state; and transmitting, by the main processor, the received input signal to a server for verification that the received input signal is a valid audio trigger.

10. A method according to claim 9 wherein the input transducer is an audio input transducer, and wherein the method comprises monitoring, at the signal processor, an audio input signal received at the signal processor from the audio input transducer.

11. A method according to claim 10 wherein the trigger signal is a voice command.

12. A method according to claim 9 further comprising causing the main processor to enter an inactive state when not in use.

* * * * *